United States Patent [19]

Schoonover

[11] 4,456,983
[45] * Jun. 26, 1984

[54] SYSTEM AND METHOD FOR VISUAL DISPLAY OF WELL LOGGING DATA

[75] Inventor: Larry G. Schoonover, Houston, Tex.

[73] Assignee: Dresser Industries, Inc., Dallas, Tex.

[*] Notice: The portion of the term of this patent subsequent to Sep. 28, 1999 has been disclaimed.

[21] Appl. No.: 339,210

[22] Filed: Jan. 13, 1982

Related U.S. Application Data

[63] Continuation of Ser. No. 84,401, Oct. 12, 1979, Pat. No. 4,352,166, which is a continuation-in-part of Ser. No. 949,592, Oct. 10, 1978, abandoned.

[51] Int. Cl.$^3$ .............................................. G01V 1/40
[52] U.S. Cl. ...................................... 367/69; 340/856; 346/33 WL
[58] Field of Search ......................... 73/152; 340/860; 367/33, 68, 69; 346/33 WL

[56] References Cited

U.S. PATENT DOCUMENTS

| | | | |
|---|---|---|---|
| 3,721,960 | 3/1973 | Tinch et al. | 73/152 |
| 4,010,476 | 3/1977 | Elliot | 340/860 X |
| 4,352,166 | 9/1982 | Schoonover | 367/69 |

Primary Examiner—Maynard R. Wilbur
Assistant Examiner—K. R. Kaiser
Attorney, Agent, or Firm—Richard M. Byron; Patrick H. McCollum

[57] ABSTRACT

An improved well logging system and method is provided for deriving and visibly displaying a recordable representation of a comprehensive lithological profile of the earth materials traversed by a borehole. In a particular form of the invention, all logging measurements are derived in digital form and on the same depth-dependent bases, such that measurements taken during one trip through the borehole may be combined or processed with other logging measurements taken during a different trip through the same borehole of interest, such that all of the measurements may then be processed at one time to derive the various lithological indications sought to be provided.

An improved monitoring system and technique is further provided, such that those logging measurements and lithological relationships of interest may also be correlatively displayed on a real-time basis with respect to at least some of the logging measurements from which they are derived. In a further feature, apparatus and methods are provided for generating visible representations of such lithological relationships in a manner and form such as to provide both qualitative and quantitative indications of various subsurface earth characteristics along a borehole of interest. More particularly, such indications may be in both a linear and in a non-linear or symbolic form, and may also be recordable for subsequent retrieval and examination.

9 Claims, 8 Drawing Figures

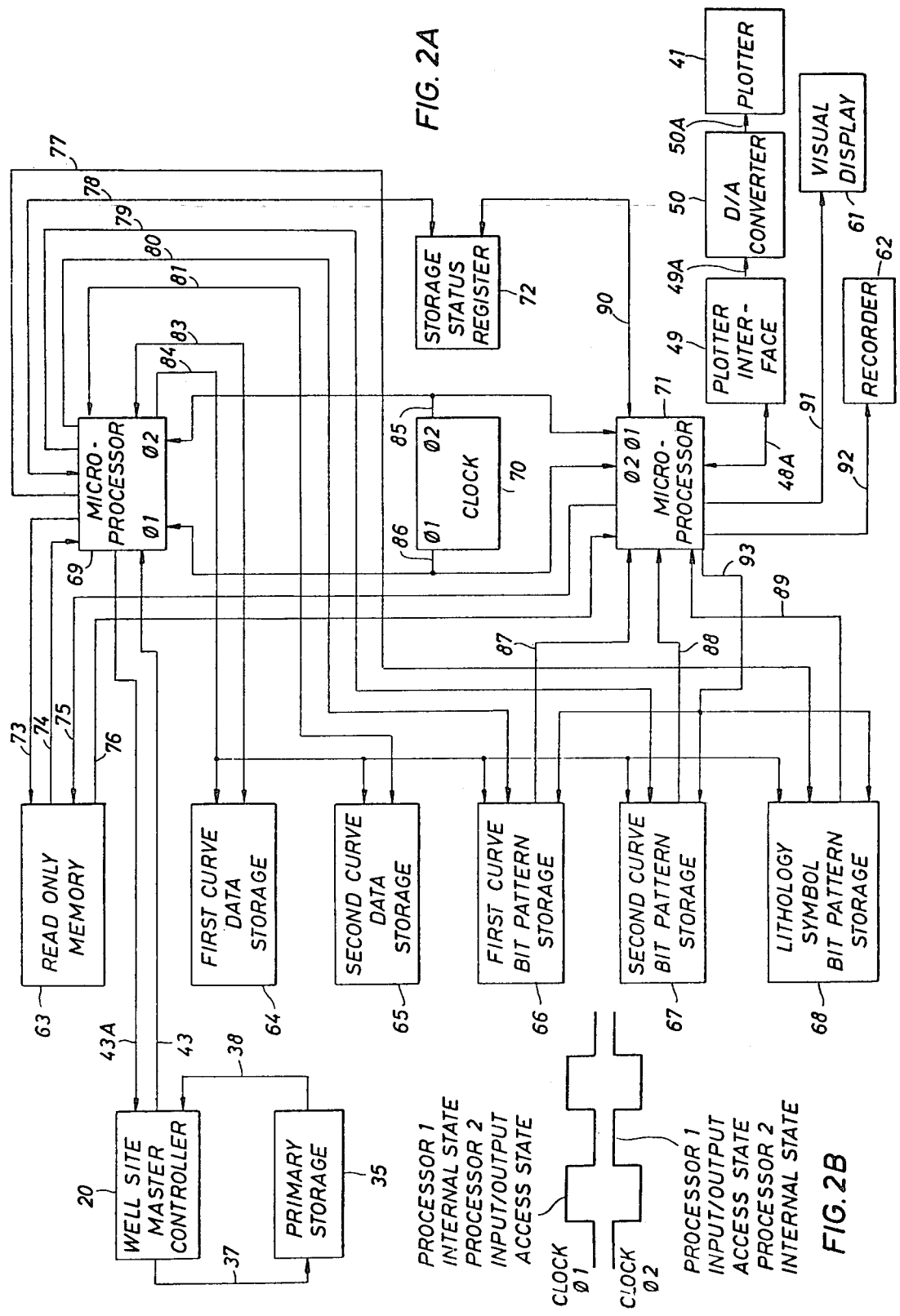

SYSTEM AND METHOD FOR VISUAL DISPLAY OF WELL LOGGING DATA

RELATED CASES

This application is a continuation of application Ser. No. 084,401, filed Oct. 12, 1979, now U.S. Pat. No. 4,352,166, which is a continuation-in-part of copending U.S. patent application Ser. No. 949,592, which was filed Oct. 10, 1978, now abandoned.

BACKGROUND OF THE INVENTION

This invention relates to improved methods and apparatus for obtaining well-logging information, and more particularly relates to improved methods and apparatus for transforming well-logging information into a more useful and informative format.

It is conventional practice in the search for petroleum substances residing in subsurface earth formations to drill boreholes into such formations, and to survey the earth materials along the length of the boreholes to determine possible locations therein where oil or gas may be recovered. These boreholes are normally surveyed or logged by passing a "sonde" through the borehole which contains devices capable of measuring various lithological parameters of interest, and thereafter transmitting these measurements to the surface for analysis.

In the early history of well-logging, logging measurements were relatively simple, being severely limited by factors such as logging tools and surface recovery equipment. Limitations on visible displays of such measurements were accordingly not of particular significance. However, as the art of well-logging progressed, logging tools and surface equipment have become far more complex, such that massive amounts of logging information are being generated in relatively short periods of time. This, in turn, frequently has created the need for generation of easily interpreted visible records of logging operations in correlatively short time periods.

For example, well-logging systems of the type depicted and described in U.S. patent application Ser. No. 949,592, filed Oct. 10, 1978, have been developed for simultaneously generating and transmitting to the surface complex measurements from a plurality of logging tools. Not only have such systems increased the number of parameters being simultaneously measured but, as previously noted, the rate at which these measurments are available for processing has increased tremendously. This may be due to a number of factors, including the faster rate at which the sonde is now caused to traverse the borehole and thus generate measurements, the increasingly smaller increments of borehole which must be sampled, and the statistical nature of some of the more modern logging tools.

Demand for more effective graphical displays of well-logging information has not only been created by the increased number and arrival rate of parameter measurements generated from within the borehole, but from other considerations as well. For example, as the science of log analysis continues to develop, more complex interrelationships between measured parameters are being discovered. More particularly, automated log analysis techniques have been developed which will now yield direct indications of formation compositions of interest, such as oil or shale zones.

It would thus be desirable to provide improved methods for automatically deriving both qualitative and quantitative indications of information lithology during the log or shortly thereafter from the complex logging data now being generated. It would also be desirable to effectively display these indications visibly so as to be more informative, useful and quickly recognizable from the log record. It has been found desirable, for example, to cause derived measurements to be presented in graphical form on a suitable terminal device, such as a video display of high resolution capability, wherein the various measurements are scaled appropriately and displayed with reference grid lines, lithological symbols, and alpha-numeric messages, all functionally related to these measurements.

It may also be appreciated that, due to the increased sophistication and complexity of modern well-logging data, it would be highly desirable to provide an automated process whereby this vast amount of data may be quickly analyzed during the logging operation for quantitative and qualitative indications of lithology and displayed in a simplified, easily comprehensible form, so as to permit dynamic adjustment and control of the logging process for example. More specifically, it would be desirable to provide the logging engineer with a real-time graphical display derived from the various measured earth parameters directly indicative, by means of lithological symbols, of the quantitative and qualitative composition of the formations currently being traversed by the sonde, and to generate a permanent record thereof during the logging operation or shortly thereafter.

Graphical displays of functions derived from various logging parameters have been generated in real-time during the logging operation or shortly thereafter, but have characteristically suffered from numerous serious disadvantages. First, these displays do not yield direct symbolic indications of formation lithology. Instead they rely upon interpretation and analysis of the displayed functions by a logging engineer to determine presence of formation materials of interest and their relative composition. While valid human interpretation of graphical logging parameter data may be suprisingly sophisticated, it is nevertheless often subject to error due to such factors as limited interpretative experience of the log operator and the like.

Moreover, formation composition frequently is derived from highly complex functional parameter relationships and analyses which are impossible for a human operator to derive during a logging operation. Still further, upon completion of the logging operation, a permanent record thereof will not have been generated which includes the results of the analysis in terms of graphical lithology symbols indicative of formation characteristics. Thus, it is frequently difficult to quickly locate from a logging chart, which may be many feet in length, for example, pay zones of particular interest from inspection of the displayed logging curves without additional visible interpretive aids.

Several attempts have been made to solve the problem of generating real-time logs having graphical symbols indicative of formation composition derived as a function of measured parameters. One such solution has been to provide capability for "freezing" portions of logging data derived over a selected increment of borehole during the logging operation. A portion of the incoming logging data derived over this increment is displayed on a suitable video screen or strip chart recorder for more detailed functional analysis while the additional data continues to be derived and recorded. Thus, the logging operation is not interrupted while the logging engineer performs more detailed visual analysis of data and makes appropriate adjustments in the log or notations regarding lithology. However, this attempted solution has been found unsatisfactory for numerous reasons.

First, only data from selected increments of borehole may be thus analyzed in greater detail while the logging operation continues. Furthermore, the analysis is not automated, and is therefore still subject to the hereinbefore noted human experience, speed and accuracy limitations. Thus, for example, adjustments of the logging operation in response to the analysis frequently may not be made as quickly as is desired. Moreover, at the completion of the log, a permanent record thereof has still not been created with direct graphical symbols, derived as a function of the measured parameters, correlative to formation compositions of interest over the entire logged borehole.

Even when real-time automated functional lithological analysis of logging data is attempted through modern digital processing techniques, several problems may be encountered absent the teachings of the present invention. For example, the complexity of many functional analyses of lithology often requires rapid repetitive arithmatic calculations on large arrays of logging data with high precision, through-put, and wide dynamic range, in order for such analyses to permit commercially practicable logging speeds. Moreover, again due, in part, to the immense complexity of logging data which is being processed in need of visual display, means have been sought for converting the processed data, which may include curvilinear log functions, lithological symbols, and the like, from digital form to a suitable visual peripheral display at such a rate as to not constrain logging rates. Yet, due to the hereinbefore-noted processing times heretofore required for digital logging data analysis and display, such detailed real-time lithological analysis and display of logging data during the logging operation was thought to be impracticable.

Yet another problem was frequently encountered in the prior art which heretofore frequently precluded performing lithological analysis in real-time or directly after completion of the logging operation. Such analysis often requires measurements of a plurality of logging parameters, each of which is derived at identical preselected borehole depths. However, often such required measurements may not all be generated in a single traversal of the sonde through the borehole, due to physical constraints on the number of logging tools which may be joined in tandem and the like. Thus, more than one pass of the sonde through the borehole was often required.

However, difficulty was frequently experienced in the prior art in assuring that all such measurements were, in fact, derived at the same borehole elevations, in that they were not correlatively generated on a depth-dependent basis. Moreover, even if the real-time measurements were being derived at borehole depths correlative to the historical measurements, logging systems and methods of the prior art had no known method for correlatively recording or "merging" such real-time and historical measurements during the logging operation, whereby they could thereafter be immediately processed and lithological conclusions derived therefrom. Rather, conventional logging systems would generate a recording during each pass of the sonde through the borehole, each of which was then correlatively re-recorded with the other recordings to generate a merged or "consolidated" recording or digital tape of all such measurements required for lithology analysis. Only after generation of such a merged tape was the comprehensive lithological analysis performed, frequently many hours after the derivation of the last logging measurement required for such analysis.

Other serious problems have also been encountered even in attempts to generate records of logs after completion of the logging operation having direct indications of lithology such as symbols superimposed thereupon. It has been known that digital magnetic tapes of logging measurements may be made and thereafter processed after completion of the logging operation, so as to generate functions indicative of formation composition and correlative graphical records thereof. However, it has been found that long processing times are often needed to derive the necessary functional relationships from the complex logging parameter measurements and to thereafter generate correlative electrical indications of lithology symbols suitable for a plotting or display device. These processing times have thus heretofore seriously impaired the value of historically generated logs having lithology symbols.

One reason for this, for example, is that expensive well-site personnel time and equipment are frequently "tied up" after the log operation while the enhanced log record is generated for use in determining whether a re-log of the borehole is required or the depth at which a well is to be completed. Accordingly, it will be appreciated that it is desirable to provide a system and method for automatically analyzing logging parameter measurements and generating, either during the logging operation or shortly thereafter, a permanent record of such functional analysis including direct symbolic indications of formation compositions. Moreover, it would be desirable to do so with significantly reduced data processing times so as to avoid the previously noted unnecessary and expensive tying up of personnel and equipment.

The disadvantages hereinbefore noted are overcome with the present invention, and novel methods and apparatus are provided for automatically deriving, both in real-time during a logging operation or shortly thereafter, a graphical record of the functional analysis of the well-logging parameters which includes, as a result of such analysis, direct qualitative and quantitative symbolic indications of formation composition of interest, such as shale or hydrogenous zones.

Preferred Embodiment

As hereinbefore indicated, it has long been desired by the industry that means or methods be provided for generating a complete lithological profile, of the materials surrounding the borehole, not only directly from the well-logging signals being generated from the sonde, but also preferably at the well site where such information is most required. In other words, what has been sought is a technique wherein the electrical signals being generated by or from the logging sonde may be fully processed as they are received at the surface, and whereby such processing may, in turn, provide the desired lithological data for display and recording as the logging signals are being generated and without any intervention.

There are a number of different reasons why this has not previously been possible, however. In the first place, a comprehensive or reasonably complete lithological profile requires the making of at least eight or ten different logging measurements, and this is beyond the capability of any well-logging tool or sonde which is presently available to the industry. However, whenever a well is re-logged to make the various measurements not taken during the first logging trip, the measurements taken during one trip through the borehole will be inherently incompatible (due to the differences in depth measurements, position in the borehole, etc.) with those measurements taken during another different trip through the same borehole. Furthermore, this incompatibility between the different measurements is aggravated whenever one logging signal is inherently different, in either form or substance, from another different type of logging signal. In other words, a time-dependent logging, such as a conventional acoustic velocity measurement is inherently different from an event-dependent measurement such as a "gamma-gamma ray" log, even when both logging signals are generated during the same trip through the borehole.

Even if all of these problems did not exist, however, it will be readily apparent to those having both skill and experience in this art that such a logging operation will create a "traffic problem" with respect to such a large number of incoming data signals, and will therefore require substantially elaborate signal processing equipment to concurrently handle all these signals so as to generate a comprehensive profile output at the same time that the sonde is progressing up the borehole. Although computers and other such signal processing gear is theoretically available to receive and process such a high volume of incoming data, such equipment is not easily and conveniently transported to the average well site.

Finally, and even if such a computer was made available at the well site, it should be further noted that no means or methods have previously been available whereby the logging operator or other personnel at the well site may observe and monitor the operation as it is being conducted, and whereby an opportunity to adjust or otherwise correlate these incoming signals, or the lithological output data, is provided before the sonde finishes its trip through the borehole and the resulting lithological profile has been completed. This feature is always critical to any logging operation, since it is necessary for the logging operator to "fine tune" his system to a greater or lesser degree with respect to any logging operation, and it is often further necessary for him to adjust the system to eliminate or compensate for one or more obvious anomalies in the signals in the making of almost any well logging measurement that is being generated or recorded. In the simpler systems, wherein the logging signals are merely being generated for recording purposes only, wherein such recorded signals are later processed at some remote location, the operator merely monitors the system by watching the cameras or chart recorders.

As also hereinbefore indicated, certain new improvements in well logging technology have provided solutions to some of these problems. For example, the methods and system depicted and described in U.S. patent application Ser. No. 949,592, include provisions for converting all logging signals to digital form before they are transmitted to the surface, whereby such signals may be processed without further modification or conversion as to form. More particularly, this depicted system further includes provision for deriving all logging measurements on the same depthdependent basis, regardless of the character of the measurements sought to be taken, whereby all such measurements will be inherently compatible with respect to further processing.

The fact that there is an inherent structural limitation on the number of different sensing elements, which can be incorporated into a logging sonde at one time, is still a restriction on the number of different measurements which it is possible to make during a single trip through the borehole. If the logging measurements are all derived in digital form and on the same depth-dependent basis, however, then such signals may be conveniently and easily "merged" (correlatively combined) as they are derived by means of the techniques described in U.S. patent application Ser. No. 054,073, filed July 2, 1979, even though different ones of such logging signals are generated during different trips through the borehole. Thus, five of the measurements may be derived and stored by use of such technology, and may then be retrieved and "merged" into or in conjunction with other related logging measurements being taken during a subsequent trip in order to provide a basis for deriving the complete lithological profile sought to be achieved.

These novel "merge" techniques do not, of course, solve the traffic problem which is effectively created by such a solution, and which is also pertinent to the objective of providing a comprehensive lithological profile of the earth substances about the borehole. An improved technique and relatively simplified system for handling a high traffic input of digital logging signals is now available as broadly described in U.S. patent application Ser. No. 030,056, filed Apr. 13, 1979, whereby this too is no longer a problem.

It will be apparent that these logging signals cannot be effectively processed for these purposes unless an effective technique for monitoring the operations is also provided. Accordingly, this problem or inadequacy with respect to the prior art has now been overcome by the present invention, and improved methods and means are herewith provided for generating and presenting a visible representation of a plurality of different lithological characteristics on a real-time basis with respect to well logging measurements from which they are derived.

In a preferred embodiment of the invention, a well-logging system is provided which, in its overall concept, includes a sonde which generates, at preselected intervals along a borehole, electrical representations of a selected plurality of parameter measurements, a logging cable for suspending and passing the sonde through the borehole past the formations of interest, and appropriate circuitry at the surface for processing, recording, and displaying data provided by the sonde. More particularly, the sonde will preferably include circuitry whereby one or more of these measurements are converted or formed into "frames" of digital representations which, in turn, are transmitted through the logging cable to the surface in response to a depth-dependent command signal. At the surface, all data signals are stored for sequential sampling and processing, before being recorded and displayed.

It is a particular feature of the invention to coordinate different logging measurements to provide more informative visual records thereof. For example, it has become increasingly desirable for real-time and historical logging data to be generated in a form such that it can be conveniently correlated to provide information not easily obtained by mere comparative visual inspection of data obtained by conventional techniques, whereby functional conclusions may be derived in a more accurate manner for judging whether to complete the well at a particular depth or the like.

Accordingly, referring again to the surface equipment portion of the overall system, there is provided a master controller for deriving from the stored digital logging parameter data, either during the logging operation or shortly thereafter and in response to a preselected log analysis program, digital representations of two preselected functions thereof. The functions, such as water-filled and total porosity are preselected such that any difference in their magnitudes at a given borehole depth, after normalization with respect to each other, is indicative of presence of a particular formation, composition or characteristic of interest, such as hydrocarbons in the case of the porosities noted.

For example, conventional gamma ray, acoustic velocity, and formation resistivity measurements may be derived by logging tools well known in the art at preselected borehole depths. The pre-programmed controller may then derive and store, for further processing, digital representations at each such depth of formation shale volume from the gamma ray measurement, formation total porosity from the acoustic velocity measurement and the shale volume function, and a water saturation function from the total porosity function and the resistivity measurement, in accordance with well-known functional relationships between the measurements and the correlation functions. In like manner, corresponding representations for formation water-filled porosity at each depth may be functionally derived from the total porosity and water saturation functions, for example, an then stored for further processing and display.

More particularly, a processed data storage for total porosity values may be provided. This storage is sequentially filled with digital representations of formation total porosity at correlative sequential borehole depths, as calculated by the controller from gamma ray measurements and correlative shale volumes, as well as acoustic travel times, at these depths provided by the sonde. In like manner, a storage for water-filled porosity may be sequentially filled with digital representations of formation water-filled porosity at such depths, as calculated from the total porosity and water saturation functions derived from parameters generated by conventional logging tools at these depths.

In a preferred embodiment of the present invention, a visual display is created, wherein the two porosity functions of measured log parameters are graphically displayed as a function of borehole depth at which they were derived. Both functions are plotted together on the same vertical and horizontal axes. More specifically, discrete locations on the vertical axis correspond to discrete depths at which the parameters and resultant functions' values were derived, and horizontal displacement corresponds to the magnitude of the derived functions at that depth.

A conventional digital plotter is provided which exposes dots of light on the horizontal axis of film contained therein. The dots are positioned correlative to the positions of digital "1's" in a sequential bit-pattern of 1's and 0's. The total of such bits for a given line may be preselected to achieve the desired horizontal visual resolution. A first microprocessor retrieves from storage the digital representation of the value for the first or rightmost (total porosity) function at a first borehole depth, previously calculated from the acoustic and shale volume measurements at that depth and stored. The microprocessor will then generate and store, in response thereto, a first bit-pattern or sequence of these 0's and 1's, the total number of which is preselected, as previously noted. A digital 1 is positioned in the sequence at a location correlative to the first (total porosity) function value at that depth and also correlative to the desired location in the horizontal plane for a representative dot of light on the plotter film.

The first microprocessor will then, in like manner, retrieve from a next storage, the digital representation of the value of the second or leftmost (water-filled porosity) function, calculated from the total porosity and water saturation at the same first depth. A second bit-pattern will then be generated and stored in response thereto. The digital "1" is again positioned in the series of 0's at a point correlative to the value of the second (water-filled porosity) function at that depth, and the total number of these bits again equals the noted preselected number. This point, in like manner, also corresponds to the desired location in the same horizontal plane for a representative dot of light on the plotter film.

A third "symbol" bit-pattern which is a pictorial-like or "non-linear" visible representation of the presence of a lithological characteristic will be generated and stored by the first microprocessor so as to cause a regular lithological symbol pattern of light dots to be exposed in the same horizontal plane between the two function value dots when plotted. More particularly, a second microprocessor withdraws the three bitpatterns thus generated from their respective storages, "ors" them together, and delivers the consolidated horizontal pattern of 1's and 0's to a suitable digital plotter. Successive sets of three bit-patterns each are generated and consolidated for each pair of function values derived at successive borehole elevations.

Successively generated consolidated horizontal lines are displayed at successive adjacent positions along the vertical axis of the plotter film. More particularly, each time a consolidated pattern is employed to expose a horizontal line of film in the plotter, the film is advanced a preselected increment in the vertical direction. The amount of advance is proportional to the increment of borehole overwhich the next function values and corresponding parameter pairs were derived, and is preferably constant. Each successive consolidated pattern, derived from function values at a borehole elevation adjacent to those corresponding to the previous pattern, is then used to expose an adjacent line on the film.

With respect to the third (symbol) bit-pattern or non-linear representation, a matrix, preferably $16 \times 16$, formed of 1's and 0's, is stored in an appropriate memory device. The relative location of the 1's and 0's forms a preselected pattern symbolic of the particular lithology or formation characteristic to be displayed, as determined by the difference between the two calculated and preselected functions.

For example, hydrocarbon presence, which may be indicated by a normalized total porosity curve function value exceeding that of water-filled porosity, might be designated as a solid black symbol of 16 lines, wherein each line is comprised of 16 1's. In the alternative, a dot pattern may be selected of 16 lines, wherein each line is comprised of alternating 1's and 0's, and wherein the odd and even numbered lines of the matrix start with 0's and 1's, respectively.

The third bit-pattern for a particular horizontal line is generated from this matrix as follows. A horizontal pattern of 1's and 0's from a line of the matrix is retrieved from the matrix storage by the first microprocessor. The bits in the bit-pattern sequence from the particular matrix line will be repeatedly generated and sequentially stored. However, prior to storage, any 1's which may appear will be replaced with a 0. This will continue until the number of 0's thus generated and stored equals the number of bits sequentially generated in the second (leftmost) bit-pattern up to and including the "1".

Thereafter, all 1's appearing in the re-cycling matrix line will be included as the bits in the re-cycling matrix line continue to be sequentially generated and stored. This will continue until the number of 1's and 0's thus currently generated and stored for the third bit-pattern equals the total number of 0's generated in the first (rightmost) bit-pattern up to the 1 of the first bit-pattern. It will be recalled that this "1" corresponds to the first or rightmost function value. Thereafter, as the matrix line continues to recycle, 1's will again be replaced by 0's until the preselected total number of bits for a horizontal line is reached.

Thus, it will be seen that the third bit-pattern thereby generated for a particular line on the plotter film will be comprised of a series of 0's until the location of the "1" in the second (leftmost) bit-pattern is reached. Thereafter, a pattern of 1's and 0's correlative to the particular matrix line will be generated and stored until preferably performs the function of generating the hereinbefore noted function bit-patterns from the stored porosity data as well as the third symbol bit-patterns. The second microprocessor will, simultaneously with the generation of the three bit-patterns by the first microprocessor, perform the function of retrieving these porosity and symbol bit-patterns from their respective storages, and combining or "or-ing" them, prior to delivering the combined or consolidated bit-patterns to suitable peripheral devices.

These peripheral devices may include conventional digital recorders and a visual display to enable an operator to monitor and adjust the logging operation in response to the display. They will also preferably include the previously noted large and small scale digital film plotters for presenting the logging data, in correlation with other indicia such as supplementary cross-hatching, to more informatively describe and represent the lithological character of the earth material of interest.

As each successive and adjacent pair of function values is used to generate first and second bit-patterns for the pair, a corresponding adjacent matrix line is used to generate a third (symbol) bit-pattern for the pair. When 16 such pairs have each had their corresponding first, second and third bit-patterns thus generated, the sequential selection of matrix lines recycles whereby the first matrix line is again used with the next pair.

SUMMARY OF THE INVENTION

In one form of the present invention, methods and apparatus are provided for deriving a plurality of depth-dependent well logging measurements from a borehole of interest, for deriving correlative lithological indications in recordable form on a real-time basis with respect to at least part of such well-logging measurements, and for providing a visible or video display of such indications as they are derived. A feature of the present invention includes the provision of means and methods for deriving such well-logging measurement in digital form, whereby the advantages and objects of this invention may be more easily achieved. Another feature of the present invention includes means and methods for deriving all well-logging measurements in digital form and on the same depth-dependent basis, whereby all such logging measurements are inherently compatible with respect to subsequent processing.

A particular feature of the present invention includes provision for deriving and thereafter storing some of the logging measurements sought to be later used to derive the aforementioned comprehensive lithological profile of the borehole. Accordingly, these stored measurements may then be retrieved and correlatively combined with other such measurements being derived during a later trip through the borehole, and to provide part of the basis for the lithological indications intended to be derived therefrom.

Another particular feature of the present invention includes means and methods for deriving both quantitative as well as qualitative indications of the subsurface lithology traversed by a borehole. In particular, means and methods are provided for deriving such quantitative indications directly from the manner or technique employed for visibly presenting at least some of the other lithological indications sought to be derived. More particularly, novel display means and methods are provided for presenting visible representations of such lithology, both in linear and in non-linear or symbolic form, and also in a form whereby such representations may be recorded for later retrieval as they are generated.

In further features or aspects of the present invention, novel means and methods are provided for deriving complex lithological relationships from basis well-logging measurements, not only directly from such logging measurements, but also either wholly or partly from intermediate functional relationships derived from at least some of the basic logging measurements. More particularly, both complex lithological functions and the simpler intermediate functions are preferably derived on a real-time basis with respect to at least some of the basic or original well-logging input signals, and may also be wholly or partly displayed on a real-time basis for visual observation by the logging operator.

Accordingly, it is a particular feature of the present invention to provide a method of investigating the character of subsurface earth materials traversed by a borehole, comprising deriving at least one depth-dependent well logging measurement at selected locations within and along the length of said borehole, deriving from said well logging measurement a functionally related measurement of a selected lithological characteristic of said materials traversed by said borehole at said selected locations, and displaying a visible and recordable representation of said lithological measurement of said materials together with a correlative indication of the depth of said locations along said borehole.

It is another particular feature of the present invention to provide a system for investigating the characterics of subsurface earth materials traversed by a borehole, comprising logging means for surveying the length of said borehole, sensing means in said logging means for deriving at least one depth-dependent and electrical logging signal from said materials within and at selected locations along the length of said borehole, signal processing means for deriving from said electrical logging signal a functionally related measurement of a selected lithological characteristic of said materials traversed by said borehole at said selected locations, and display means interconnected with said signal processing means for electrically presenting a visible and recordable representation of said lithological measurement together with a correlative indication of the depth of said locations along said borehole.

It is a further particular feature of the present invention to provide a method of investigating the character of subsurface earth materials traversed by a borehole, comprising deriving a first well logging measurement of said earth materials at selected locations along the length of said borehole, thereafter deriving a second well logging measurement of said earth materials of said locations along the length of said borehole, deriving a recordable measurement of a selected lithological characteristic of said materials at said locations on a real-time basis relative to said second well logging measurement and as a function of said first well logging measurement, and displaying and recording a visible representation of said measurement of said selected lithological characteristic.

It is also another particular feature of the present invention to provide a system for investigating the character of subsurface earth materials traversed by a borehole, comprising logging means for surveying the length of said borehole, first signaling means for generating a first electrical logging signal as a functional derivative of the earth materials at preselected locations along the length of said borehole, second signaling means in said logging means for generating a second electrical logging signal as a functional derivative of the earth materials at said locations along the length of said borehole, signal processing means interconnected with said logging means for deriving a measurement signal representative of a selected lithological characteristic of said materials at said locations on a real-time basis relative to said second logging signal and as a function of said first logging signal, and display means interconnected with said processing means for displaying and recording a visible representation of said lithological measurement signal.

It is also a further particular feature of the present invention to provide a system for investigating the character of subsurface earth materials traversed by a borehole, comprising sensing means for deriving a plurality of different digital well-logging measurements of said materials within and along the length of said borehole, signal processing means interconnected with said sensing means for deriving an electrical indication of a first selected lithological characteristic of said materials at said locations as a function of selected ones of said logging measurements and an electrical indication of second different selected lithological characteristic of said materials as a function of at least one of said logging measurements, display means interconnected with said processing means for electrically presenting visible and functionally correlative representations of said first and second lithological characteristics of said materials at said locations along said borehole and another different visible representation of the presence and magnitude of a third lithological characteristic of said materials as a function of said representations of said first and second lithological characteristics.

These and other features and advantages of the present invention will become apparent from the following detailed description, wherein reference is made to the figures in the accompanying drawings.

IN THE DRAWINGS

FIG. 2A is another functional representation of the present invention, including a more detailed representation of the plotter controller portion of the apparatus depicted in FIG. 1.

FIG. 2B is a timing diagram depicting operation of a portion of the apparatus of FIG. 1.

DETAILED DESCRIPTION

As hereinbefore explained, the present invention is directed to an improved well-logging system of the type depicted in the prior U.S. patent application Ser. No. 949,592, and reference may be had thereto for details of the system. Still further, the present invention incorporates a particular embodiment of the dual-processor microprocessor system of the type generally depicted in the prior U.S. patent application Ser. No. 030,056, filed Apr. 13, 1979, and reference may also be had thereto for the details of this system.

Thus, the disclosure of the prior applications are considered to be incorporated herein for all intents and purposes and with reference to a full understanding of the improvement of the present invention. It should be apparent that FIG. 1 of the accompanying drawings parallels FIG. 2 of the prior application Ser. No. 949,592 and that FIG. 2 incorporates portions of FIG. 1 of the prior application Ser. No. 030,056. The operation of the lithological symbol generator circuitry of the present invention and its environment are thus identical with that of the prior applications, except as hereinafter set forth. The prior applications should therefore be referred to for a complete understanding of the overall digital well-logging system operation and for the location, detailed operation and coaction of the symbol generator circuitry, including the dual-processor, disclosed herein.

Figure 1:
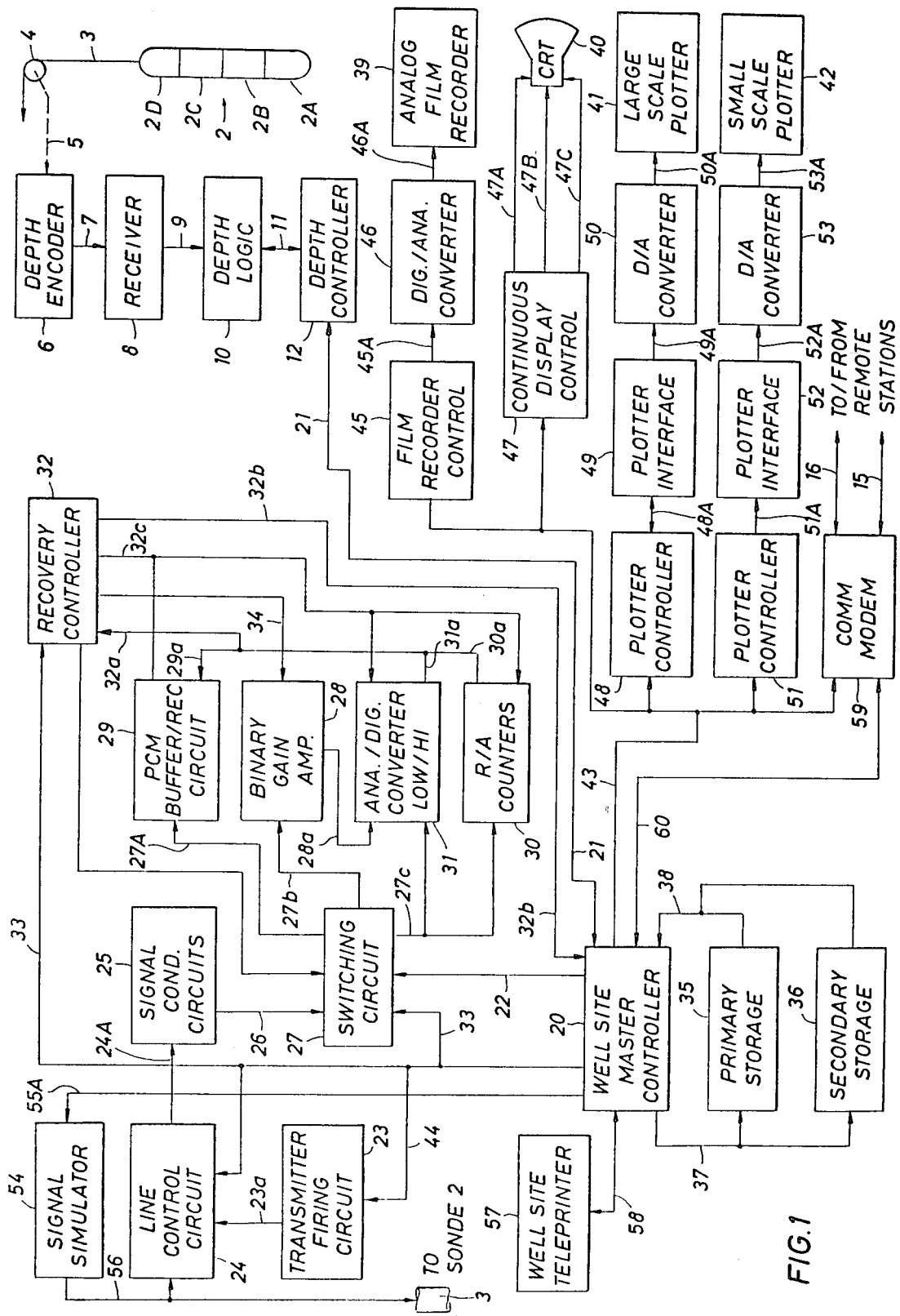
FIG. 1 is a simplified functional representation of an embodiment of the present invention.

Referring now to FIG. 1, there may be seen a simplified functional diagram of one embodiment of the present invention, and wherein there is more particularly shown the logging sonde 2 which may suitably include such portions as a radioactivity logging section 2A, an induction logging section 2B, an acoustic logging section 2C, and a pulse code modulation section 2D, all arranged to provide appropriate measurements of the lithology surrounding a subsurface borehole (not depicted). Measurements from these sections may be conveniently transferred from the borehole to the surface by way of a conventional logging cable 3 which is arranged to rotate a sheave wheel 4, or the like, to provide a correlative indication of the borehole depth at which such measurements are taken. More particularly, the sheave wheel 4 may also be conveniently coupled to suitable depth encoder circuitry 6, by a drive shaft 5 or the like, whereby the depth encoder circuitry 6 will deliver a functionally correlative depth measurement signal 7 to the surface portion of the well site system, in conjunction with the measurements provided by the logging cable 3.

As previously stated, it is a feature of the well site system depicted functionally in FIG. 1 to transmit fully correlated logging measurements to a suitable base observation and control station such as that referred to in copending U.S. patent application Ser. No. 949,592, filed Oct. 10, 1978, and which, in turn, may be suitably located at a position remote from the location of the well site system. Accordingly, and as will hereinafter be explained in detail, the well site system will appropriately encode and condition these measurements to provide correlative indications to the remote base station, at the time such measurements are received from the logging cable 3, through a suitable communications link 15 which may be a conventional telephone line, radio communication satellite, or the like.

Furthermore, like signals may also be provided to the customer or user at his respective user station (not depicted). These indications, may also be conveniently transferred to the user station by a similar communications link 16 interconnecting the well site system with the user station, and thereafter relayed to base station by means of another different communications link (not depicted), or they may be relayed from the base station to the user station on such communications link. It should be noted that the well site system suggested by FIG. 1 may be operated directly by the base station, and therefore the communications link 15 may also include provision for delivering suitable control signals from the base station to the well site system by way of the communications link 15. Similarly, the communications link may be used to provide control signals from the base station to the user station or, in some circumstances, to provide control signals from the user station to the well site system or base station, by way of the communications link 16.

Referring again to FIG. 1, there may be seen a simplified functional diagram of the uphole circuits comprising the apparatus located at or composing the well site system. As will hereinafter be explained in detail, the sections of the logging sonde 2 are preferably adapted to deliver their respective measurements to the conductors composing the logging cable in a manner whereby all of the measurements are delivered to the surface together. It should be noted that information may also be desirably transferred from surface circuitry to the borehole for reasons to be hereinafter explained in greater detail. For example, it may be desirable to control various transmitters and receivers contained in acoustic logging section 2C from the surface.

Accordingly, it may be seen from FIG. 1 that at appropriate times and in response to a command signal 44 from a well site master controller 20, transmitter firing circuitry 23 may be caused to generate transmitter firing signals 23A for purposes of controlling the various circuitry in the acoustic logging section 2C of the sonde 2. This transmitter firing signal 23A may preferably be delivered to a conventional line control circuit 24 which couples the signal 23A to the appropriate conductor within the logging cable 3.

As indicated in FIG. 1, when measurement signals are received from sonde 2, the output of the logging cable 3 is preferably also delivered to a line control circuit 24 which, in turn, passes the signals as its output 24A to a suitable arrangement of signal conditioning circuits 25 for filtering, gain adjustment, and other suitable processing. The conditioned logging signals 26, which are provided by the signal conditioning circuits 25, may then be delivered through a suitable switching circuit 27 to either a PCM buffer/receiver circuit 29, or to a binary gain amplifier 28, or in a further alternative, to a low speed/high speed analog-to-digital converter 31 and suitable radioactivity pulse counters 30, by way of signals 27a, 27b, or 27c, respectively.

It is well known that the outputs from a conventional sonde 2 will be in either analog form, or in the case of radiological measurements, will be composed of pulses which occur in a random manner. As will hereinafter become apparent, however, it is particularly desirable for the purposes of the instant invention, that these signals be presented to the surface circuitry in digital form. Accordingly, and as more particularly depicted in FIG. 1, the sonde 2 will preferably include a pulse code modulation or "PCM" circuit 20 for encoding such signals in digital form before delivery to the PCM buffer/receiver circuit 29 shown in FIG. 1. If the signals are not so encoded, however, then they may be conveniently applied to a suitable analog/digital converter 31 or the like, before being processed and recorded. Alternatively, pulses deriving from radiological measurements may conveniently be applied to appropriate counters 30 and the like, which will then suitably deliver their outputs in digital form.

Referring again to FIG. 1, it will be seen that the signals being generated by the radioactivity section 2A of the sonde 2, will accordingly originate as a train of electrical pulses indicating the occurrence of radiations eminating from the borehole materials surrounding the sonde 2, and will therefore be suitably delivered to the pulse counters 30 which, alternatively, produce a suitable digitized representation of this data as output signal 30A.

On the other hand, the output signals from the induction logging section 2B and the acoustic logging section 2C of the sonde 2 will, conventionally, be delivered to the surface in the form of analog measurements representative of lithological characteristics of the borehole material adjacent the sonde 2. Accordingly, such outputs from switching circuit 27 which compose signal 27c will, in turn, be converted to digital representations of the data sought to be obtained. These representations, which are indicated as output 31A, will accordingly be conducted by a suitable lead 32A and the like to an input of the logging signal recovery controller 32.

It will be noted that the analog-to-digital converter 31 receives input signals 27c and 28a from both the switching circuit 27 and the binary gain amplifier 28. The reason for this is that, in some cases, the signals generated from the induction logging section 2B and the acoustic logging section 2C of the sonde 2 are sufficient in amplitude to be applied directly to the analog-to-digital converter 31. On the other hand, such signals are often of such a magnitude, or, alternatively, attenuated by the logging cable 3 to an exent that they exceed the dynamic range of converter 31 and must accordingly be attenuated or amplified, respectively, before they can be properly handled by the converter 31. Accordingly, the switching circuit 27 will respond to route such signals to the binary gain amplifier 28 prior to conversion of the analog signal into digital form at converter 31.

More particularly, the well site master control 20 is adapted to generate another command signal 33 to the switching circuit 27 to route its output either in the form of a digital signal 27a to the PCM buffer/receiver circuit 29, or in the form of an analog signal 27c which is delivered to the converter 31 or to the pulse counters 30. If, as hereinbefore stated, the signal 27c is of an insufficient amplitude to be properly handled by the converter 31, or if the amplitude is too great for the dynamic range of the converter 31, then the master controller 20 will, according to program, generate a command signal 22 to cause the switching circuit 27 to deliver its output signal 27b (instead of singal 27c) to the binary gain amplifier 28.

It will be noted that binary gain amplifier 28 may be provided with a suitable gain control signal 34 which serves the purpose of continuously adjusting the gain of binary gain amplifier 28 in response to command signal 33 delivered to recovery controller 32 from master controller 20. It will be seen that because the input to analog-to-digital converter 31 may be periodically interrogated by master controller 20 in a manner to be described hereinafter, master controller 20 may cause gain control signal 34 to appropriately adjust gain of binary gain amplifier 28 so as to insure that input signal 28a is maintained within the dynamic range of analog-to-digital converter 31. Accordingly, the amplified signal 28a, which is produced by the binary gain amplifier 28, is then delivered to the converter 31 in lieu of the output signal 27c.

Referring again to FIG. 1, it may, for the purposes of illustration, be assumed that the sonde 2 is composed of a plurality of sensing elements such as the radioactivity logging section 2A, the induction logging section 2B, and the acoustic logging section 2C, and that all of these sensors are continually and simultaneously delivering meaningful data signals to the logging cable 3. It is preferable that the well site system sort and handle these signals in a manner to distinguish one from another, as well as to handle such signals in correlation with appropriate indication of the depth at which such signals originated.

Accordingly, the analog-to-digital converter 31, the pulse counters 30, and PCM buffers/receiver circuit 29, will all include appropriate buffer circuitry, whereby these signals may be stored until the well site master controller 20 generates its command signal 33 to cause the recovery controller 32 to interrogate the components selected. Upon such interrogation, which is indicated in FIG. 1 by the interrogation signal 32c, the recovery controller 32 will cause the appropriate or selected component to transfer one of outputs 29A, 30A or 31A to the recovery controller 32 which, in turn, conducts such information to the master controller 20 in the form of output 32b. Upon receiving output 32b, the master controller 20 conducts such output to either the primary storage facility 35, or the secondary storage facility 36 by means of the input signals 37.

As hereinbefore stated, the measurements provided by the logging sonde 2 must be correlated with an indication of the depth at which such measurements are taken. Accordingly, it should be noted that when the master controller 20 generates its command signal 33, it also generates an appropriate depth data/control signal 21 to cause the depth controller 12 to delivery the information it has previously taken from the output 11 of depth logic 10. Thus, this data, which also passes to the controller 20 by way of the depth data/control signal 21, will be correlated effectively with the logging data signals provided by the recovery controller 32 in the form of output 32b. It will be noted that in order for depth logic 10 to provide appropriate information to depth controller 12, information from depth encoder circuitry 6 may conveniently be transmitted to receiver 8 by means of depth measurement signal 7, and from receiver 8 to depth logic 10 on receiver output 9.

There may further be seen in FIG. 1 visual display and recording devices which may preferably include analog film recorder 39, visual display 40, and a suitable large scale plotter 41 and small scale plotter 42. Information which is desired to be displayed or recorded may be transferred to these various display or recording apparatus from master control 20 through logging data information signal 43. More particularly, information signal 43 may be desirably routed to a film recorder controller 45 which will provide necessary interfacing between master controller 20 and digital-to-analog converter 46, and thereafter communicated from controller 45 to converter 46 on output line 45A. After conversion of the digital information on line 45A by converter 46 to analog information, this analog information may be conveniently coupled by output line 46A to analog film recorder 39. It should be noted that recorder 39 may preferably be a conventional galvanometer type recorder well known in the well logging industry which is particularly suited for recording graphical data and the like associated with well logging operations.

In like manner, data from master controller 20 carried on information signal 43 may also preferably be communicated to continuous display controller 47 which may process these signals to provide output signals 47A, 47B and 47C which are communicated to visual display 40. More particularly, and as will hereinafter be explained in detaill, continuous display controller 47 may preferably process information signal 43 so as to generate a visual picture of desired well logging information over a preselected borehole depth interval which has been traversed by sonde 2.

Still further, it may be seen from FIG. 1 that the information signal 43 may be conveyed to a plotter controller 48 for processing the desired information signal 43, in a manner to be hereinafter described in greater detail, prior to being delivered as input 48A to a suitable plotter interface 49. The function of the interface 49 is to further adapt these information signals 43 for delivery as output 49A to suitable processing circuitry such as a digital-to-analog converter 50, wherein they are converted to an appropriate analog output 50A for recording on film within the large scale plotter 41.

In like manner, it may be desirable to display various information signals 43 associated with the well logging operation on a smaller scale than that employed in larger scale plotter recorder 41. Accordingly information signals 43 may be introduced into plotter controller 51 which may suitably process and transfer these signals as output 51A to plotter interface 52 which, after additional signal processing, will communicate these signals as output 52A to suitable circuitry such as a digital-to-analog converter 53 wherein they may be converted to an appropriate analog output 53A to small scale plotter 42.

It will be noted that information signals 43 which are provided to analog film recorder 39, large and small scale plotters 41 and 42, respectively, as well as those provided to visual display 40, may be desirably under the control of master controller 20. Accordingly, controller 20b may desirably provide information signals 43 so as to cause display and recording of well logging information in a variety of formats and from a variety of sources. These may include, for example, primary storage 35 and secondary storage 36, which may transfer information stored therein to master controller 20 as storage output 38 and in response to input signal 37.

It will be readily apparent that for purposes of testing the operation of the integrated well logging system herein described, or for purposes of personnel training or the like, it may be desirable to simulate the various signals associated with sonde 2 without the necessity of actually providing the sections of well logging circuitry normally contained therein, and further without the necessity of subjecting the sonde 2 to an actual borehole environment. Accordingly, in FIG. 1 there may be seen a signal simulator 54 which, in response to appropriate simulator command signals 55A, may generate various test signals 56 as hereinbefore mentioned which, for example, may include signals similar to those which might be expected to be present on logging cable 3 from sonde 2. It will further be noted that these test signals 56 may appropriately be delivered to line control circuit 24, thus simulating similar signals on logging cable 3 which may also be delivered to the input of line control circuit 24.

While the present invention contemplates automatic performance of the various well logging tasks under control of master controller 20, it may be appreciated that it is often desirable to include provisions for human interaction with the integrated well logging system of the present invention. For example, it may be desirable for a logging engineer to override various functions performed by master controller 20, to adjust the format or scaling of information provided to the various peripheral display devices, or to communicate directly with base station or user station. Conversely, it may further be desirable for master controller 20 to have the capability of outputting information to a human operator. Accordingly, a suitable well site teleprinter 57 may be provided for such communication between master controller 20 and a human operator having an interrogate/respond channel 58 for interrogating or instructing controller 20 in a conventional manner, and also for receiving appropriate information therefrom.

As hereinbefore stated, it is a feature of the present invention to provide for observation and control of well site logging operations from a remote base station or user station. Referring now to FIG. 1, there may be seen a communications modulator-demodulator or "modem" 59 which may transmit information signal 43 to base station and user station on communication links 15 and 16, respectively, under control of a data/control signal 60 from controller 20. It will furthermore be noted that modulator-demodulator 59 may conveniently be adapted to receive information and control signals from base station and user station on communication links 15 and 16, respectively, which are further communicated to controller 20 as indicated by data/control signals 60.

Referring now to FIG. 2A, there will be seen a functional representation of the present invention including a more detailed representation of the plotter controller 48 portion of the surface equipment depicted in FIG. 1. Detailed description of the apparatus of FIG. 2A will be facilitated with reference to an illustrative general representation of the type of visual image which may be created by the circuitry of the present invention and recorded on conventional film in the plotter 41.

Figure 3A:
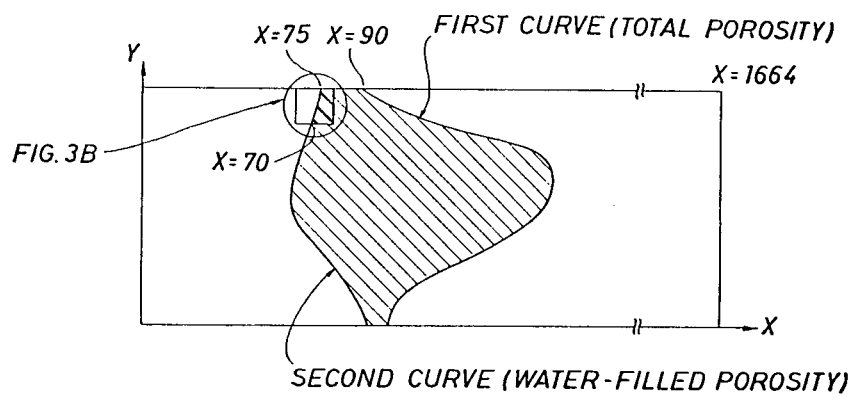
FIG. 3A is a schematic representation of a typical display of the present invention.
Figure 4:
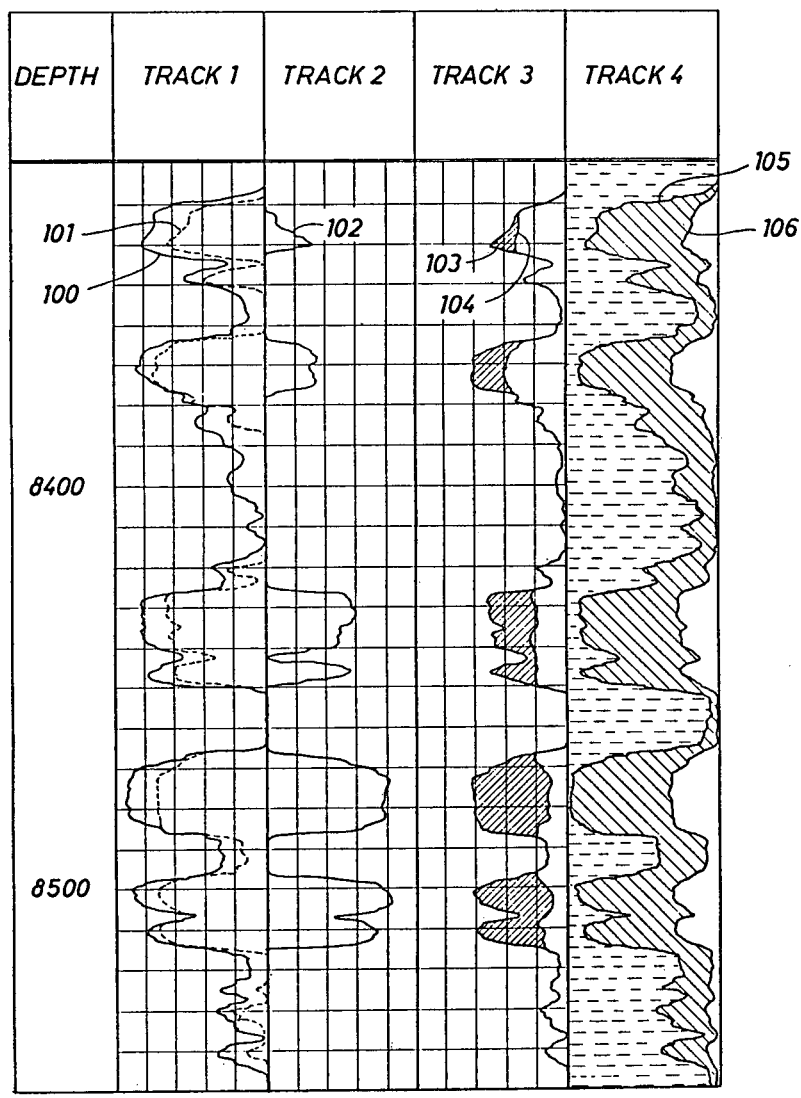
FIG. 4 is a more detailed pictorial representation of a typical display of the present invention.

Accordingly, such an image may be seen in FIG. 3A and FIG. 4. More particularly, in FIG. 3A there will be seen a large rectangular area representing a portion of exposed film from the plotter 41. This area illustrates a typical graphical representation of logging measurements and formation composition symbols derived over an increment of borehole and generated by the present invention. Alphanumerics and X-Y graph axes, while contemplated by the present invention, have not been included primarily for purposes of facilitating description of the feature of displaying graphical logging curves and the related symbols.

In the simple case illustrated in FIG. 3A, it will be seen that the present invention has generated curvilinear plots of two functions, a first or total porosity curve function, and a second water-filled porosity curve function. The X axis corresponds to values of these functions and the Y axis corresponds to borehole depth at which the function value and their related logging parameter were derived. For purposes of illustration, the right-hand border of the film has arbitrarily been set at a dimensionless value of 1664, and the two functions normalized with respect to this scale and each other, such that any area between the two plotted curves will correspond to presence of a formation composition of interest, to be hereinafter described in more detail.

Referring to the first porosity function, it may be assumed that porosity has been derived as a function of borehole depth in accordance with any of a number of techniques well known in the art. These may include, for a simple case, measurements of gamma radiations and acoustic travel times by appropriate logging tools over a sequence of preselected increments of borehole, as described in more detail in U.S. patent application Ser. No. 949,592. Formation total porosity ($P_T$) may then be determined from the wellknown relationship $$P_T = \frac{T_{log} - T_{ma}}{T_f - T_{ma}} - V_{sh}\left(\frac{T_{sh} - T_{ma}^{\oplus}}{T_f - T_{ma}}\right)$$

where $T_{log}$ = log acoustic travel time in zone of interest
$T_{ma}$ = matrix acoustic trave time
$T_f$ = formation acoustic travel time
$T_{sh}$ = shale acoustic travel time $$V_{sh} = \text{Formation shale volume} = \frac{GR - GR_{min}}{GR_{max} - GR_{min}}$$

and where

GR = log gamma ray count in zone of interest
$GR_{min}$ = average minimum gamma ray count (clean sand, 0% shale)
$GR_{max}$ = average maximum gamma ray count (100% shale)

In like manner with respect to the second or water-filled porosity measurement ($P_w$) it may also be derived as a function of borehole depth in accordance with a number of known techniques. One such simple technique is to first derive the formation water saturation ($S_W$) at the same borehole increments given by $$S_w = \frac{1}{P_t} \times \frac{R_w}{R_t}$$

where P1 $R_w$ = resistivity of formation water
$R_t$ = true total resistivity of undisturbed formation Water-filled porosity may then be derived from the water-saturation and total porosity values previously derived and stored in accordance with the relationship $P_w = P_t \times S_w$.

Referring to FIG. 2A, it will be seen that a master controller 20 has been provided at the well site. In addition to coordinating operation of the overall logging system, in a manner previously described in the U.S. patent application Ser. No. 949,592, the controller 20 will also preferably be pre-programmed to derive from the log parameters measured by the sonde 2, digital representations for the above-mentioned functions at each borehole increment, and to sequentially store such representations for retrieval and further processing by the plotter controller 48.

More particularly, it will be recalled that the digital gamma ray, resistivity and acoustic parameter measurements are preferably sequentially stored in the primary storage 35 during the logging operation as they are being derived and as a function of borehole depth. The controller 20 will selectively retrieve these measurements on the storage output 38 during the logging operation, calculate values for the above functional relationships therefrom at the correlative borehole depths, and thereafter store these values back in the storage 35 on the input signal 37.

Thus, it will be appreciated that the first and second curves depicted in FIG. 3A are graphical displays on the digital plotter 41 of the values of these two derived functions of formation total and water-filled porosity at preselected constant borehole increments. Although the curve values have been preferably derived as a function of logging parameter measurements at discrete borehole depths, selection of an appropriate Y-axis scale will make them appear continuous as in FIG. 3A.

Referring again to FIG. 3A, it will be noted that in the increment of borehole there displayed, the normalized values for total porosity exceed that of water-filled porosity and the area between the curves has thus been shaded with a cross-hatched symbol indicating a producible hydrocarbon zone. While the case illustrated is somewhat simplistic and more sophisticated functions may be used with the present invention which, for example, may be derived from pluralities of parameters, the resultant graph may nevertheless be correlated to the physical realities of a borehole.

For example, formation total porosity function values exceeding that of water-filled porosity, as depicted in FIG. 3A, may indicate that a formation has been traversed by the sonde 2 having increased interstices not filled with water which are available for retaining hydrocarbons. Thus, by automatically superimposing a graphical lithological symbol between any two curves, wherein a meaning may be ascribed to their difference in terms of formation composition, a logging record may thus be produced having visible indications of precise depths of formation zones of interest, which may be quickly, easily, and visibly indexed to for further analysis without the need to first interpret such curves.

The plotter 41 of the present invention is preferably a digital plotter, which, as previously described in brief, will operate as follows. Conventional galvonometer circuitry will cause an electron beam to horizontally sweep across an exposable film having preselected discrete and regularly spaced horizontal locations numbering 1664 in the present illustration.

For each such sweep, an electrical sequence of digital 1's and 0's is generated, also totaling 1664, wherein the location of a particular 1 or 0 in the sequence corresponds to a correlative horizontal location on the film. As the beam is progressively positioned at each discrete location, the correlative bit position in the sequence is examined, and if a 1 is present, the beam is momentarily intensified before moving on, so as to expose the film at that location, creating a visible dot of light.

When a horizontal line on the film has thus been exposed at all points where a 1 appears in the correlative sequence or "bit-pattern" of 1664 1's and 0's, the film will be advanced by a suitable stepping motor. The above process will then be repeated for a next bit pattern of 1664 1's and 0's and a next horizontal sweep, whereby dots of light are printed on the next horizontal line at positions corresponding to positions of 1's in the next bit-pattern. It will therefore be appreciated that for each borehole elevation at which logging parameters and their related functions have been derived, in order to graphically display the functions and the lithology symbols therebetween in the manner previously described, a correlative bit-pattern of 1664 1's and 0's will be generated.

Figure 3B:
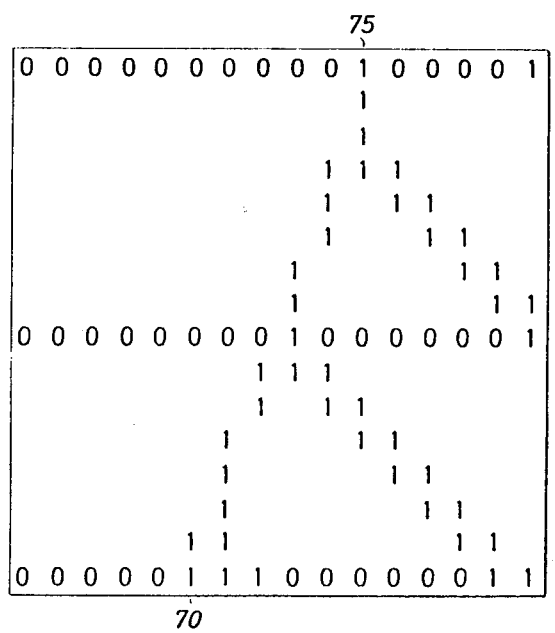
FIG. 3B is a more detailed representation of a portion of the display of FIG. 3A.
Figure 3C:
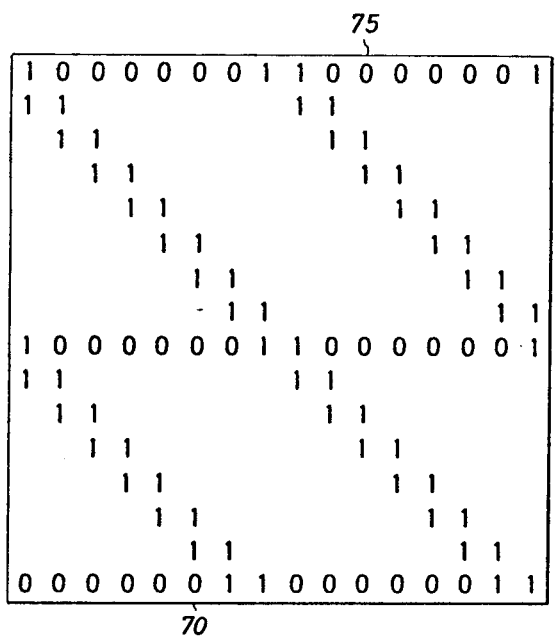
FIG. 3C is another detailed representation of a portion of the display of FIG. 3A of the present invention.

There will be seen in FIG. 3A a circled portion of the display which has been shown in greater detail in FIG. 3B. A closer inspection of FIG. 3B reveals that it is a composite of the water-filled porosity curve image of FIG. 3D superimposed on the cross-hatched lithology symbol pattern of FIG. 3C, wherein all 1's in FIG. 3C to the left of the 1's in the water-filled porosity curve of FIG. 3D have been "blanked" or replaced with 0's, although only some of the 0's have been shown. From FIG. 3A it will also be apparent that the symbol pattern of FIG. 3C is repeated continuously both in a horizontal and vertical direction. In like manner to the second curve, when the rightmost boundary of the first or total porosity curve is reached, all 1's in the symbol pattern of FIG. 3C are blanked and replaced with 0's to the right of the first curve.

Figure 3D:
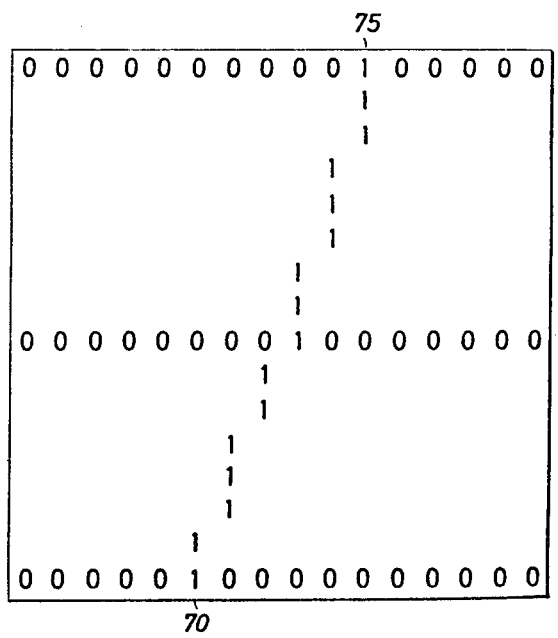
FIG. 3D is another detailed representation of a portion of the display of FIG. 3A of the present invention.

Referring more particularly to FIGS. 3B–3D, it should be noted that while the image depicted therein is comprised of 1's and 0's in order to illustrate the generating of bit-patterns used to create the graphical image shown in FIG. 3A, in actuality, the 1's only designate the visible presence of a light dot at the respective locations on the film.

It will also be noted that for purposes of clarity not all 0's have been shown, but only those for three rows. However, the locations of all 0's will be evident in that the image of the present illustration is comprised of a plurality of horizontal rows, each row comprised of 1664 evenly-spaced locations each having a 1 or 0, whereby the rows are aligned vertically so as to create 1664 columns.

It will further be noted from FIGS. 3B–3D that the horizontal rows of 1's and 0's depict only portions of complete 1664 bit patterns. However, it will be apparent from inspection of FIGS. 3A–3D that, for example, a complete bit-pattern for the topmost row of the image of FIG. 3A would be comprised of 1664 1's and 0's, with 1's at locations 75, 80, 81, 88, 89, and 90, and the rest of the 1664 locations filled with 0's. The 1's at locations 75 and 90 are due to normalized water-filled and porosity function values of 75 and 90, respectively, at that borehole or Y-axis elevation. In like manner, the 1's at locations 80, 81, 88, and 89 are due to the repeated symbol patterns of FIG. 3C.

Referring again to FIG. 2A, there will be seen a conventional read-only memory circuit 63 having as inputs thereto address signals 73 and 75 from corresponding microprocessors 69 and 71, and also having outputs 74 and 76 delivered to the respective microprocessors 69 and 71. Prior to operation of the present invention, the program steps will be stored in the memory 63 which will be used by the microprocessors 69 and 71 for conversion of data on information signal 43 to the previously described bit-patterns for output to the plotter 41. Additionally, there will be stored in the memory 63 a desired 16×16 symbol bit-pattern such as that depicted in FIG. 3C. By addressing the memory 63 with an appropriate address signal 73 or 75, the memory 63 will be caused to deliver to the microprocessors 69 or 71 on the respective memory output 74 or 76, the next program step or symbol bit-pattern in a manner to be described which are required for generating the desired output bit patterns.

It will be noted that the symbol bit-pattern matrix of FIG. 3C has been selected so that by placing an identical matrix oriented like that of FIG. 3C adjacent any side of the matrix of FIG. 3C, the pattern will be continued in the direction of the added matrix. While only a cross-hatch symbol has been shown, it will be appreciated that many such patterns may be devised having such a property. The benefit to such a pattern is that, because a symbol pattern such as that of FIG. 3C may be repeated to generate large symbolized areas between curves as illustrated in FIG. 3A, only a relatively small symbol bit pattern storage capacity is required.

As previously noted, after the logging parameter data generated by the sonde 2, such as resistivity, gamma ray and acoustic measurements, has been processed by the controller 20 during the logging operation, the storage 35 will contain digital representations of function values derived therefrom such as total and water-filled porosity calculations. More particularly, for each preselected and regularly spaced borehole elevation, the sonde 2 will generate correlative acoustic, gamma ray and resistivity measurements. These measurements will be sequentially generated at each adjacent elevation and stored in the primary storage 35 in the sequence in which they are generated. The controller 20 will retrieve the measurements from the storage 35 in the sequence in which they were derived, calculate the correlative respective porosity function values therefrom, and restore the resultant digital representations of these values in the same sequence. Thus, during the logging operation, the storage 35 will contain one sequence of digital numbers corresponding to water-filled porosity at correlative borehole elevations and another correlative sequence of digital numbers corresponding to total porosity at these borehole elevations.

In response to a storage data signal 43A from the microprocessor 69, the controller 20 will retrieve these function values from the storage 35 on the storage output 38, and deliver them as information signal 43 to the microprocessor 69. The microprocessor 69, in turn, will store the data in the storage 64 or 65 in the manner to be hereinafter described.

The microprocessor 69 is provided with a storage address command 84 which is delivered to each storage 64–68. When the microprocessor 69, in accordance with the program steps delivered on the read-only memory output 74, has data to be stored in the storages 64–68, address command 84 will cause the appropriate storage 64–68 to receive this data on the respective data lines 83, 81–79, or 77, and to store the data at a memory address location specified by the command 84.

In like manner, when the microprocessor 69 is instructed in accordance with the program steps of the read-only output 74 to receive data from the storage 64 or 65 on the respective data lines 83 or 81, an address command 84 will cause the appropriate storage 64–65 to deliver this data to the microprocessor 69 or 71 on the data lines 83 or 81. It will also be noted that the microprocessor 71 also has an address command signal 93 which is delivered to the storages 66–68. When the microprocessor 71, in accordance with the program steps delivered on the read-only memory output 76 requires data from the storages 66–68, an address command 93 will cause the appropriate storage 66–68 to deliver data on the respective storage output 87–89 to the microprocessor 71.

Referring now more specifically to the operation of the processors 69 and 71 of FIG. 2A, it will be noted that they are preferably of the type well known in the art, which may operate in two distinct states comprising a "machine cycle", which define the functions they perform at a particular time. During a first state or first half-cycle of a complete machine cycle, a given processor 69 or 71 will be isolated from interaction with other devices, and accordingly will be restricted to performing internal calculations. In contrast, during a second state or second half-cycle of the machine cycle, the given processor 69 or 71 will no longer be isolated, but rather will be permitted to perform functions which may include the receiving of information or "input" data, or the transmission of information or "output" of data. It should therefore be readily apparent that devices which a processor may have access to for either reading or writing information during its second half-cycle may include the memories 63–68, the controller 20, and the plotter interface 49, display 61 or recorder 62.

In order to control the time during which a processor 69 or 71 is in either the first or second state, there will be seen a clock 70 shown in FIG. 2A having clock outputs 86 and 85 which are transmitted to the processors 69 and 71 for this purpose. Preferably, a first train of pulses is generated by the clock 70 and delivered on the clock output 86. A second train of pulses is also generated by the clock 70 and delivered on the clock output 85, however each pulse of the second train preferably occurs after that of the correlative pulse of the first train. It will be appreciated that pulses of the first pulse train need not be the inverse of the second pulse train. More particularly, the clock 70 may be preferably designed so that the pulses of one train do not overlap those of the other pulse train. It will also be noted that the $\phi$ 1 clock output 86 corresponds to the hereinbefore noted first half-cycle and the $\phi$ 2 clock output 85 corresponds to the second half-cycle of a processor's machine cycle.

Referring now to FIG. 2B, there will be seen a timing diagram depicting the states in which the processors 69 and 71 are operating in response to the $\phi$ 1 clock output 86 and the $\phi$ 2 output 85. From FIG. 2B, it will be seen that when a $\phi$ 1 clock output 86 is presented to the processors 69 and 71, the processor 69 will be performing the previously noted internal operations, whereas the processor 71 will be permitted to perform operations which may require inputing or outputing information such as access to the memories 63, 66-68, plotter interface 49, the display 61, or the recorder 62. Conversely, it will also be seen from FIG. 2B that when a $\phi$ 2 clock output 85 is presented to the processors 69 and 71, the situation is reversed, whereby the processor 69 may now either receive or transfer information to the controller 20 and the memories 63-68, whereas the processor 71 is now performing internal functions.

A closer examination of the clock outputs 86 and 85 to the processors 69 and 71 reveals the manner in which this result is achieved. Specifically, it will be noted that the processors 69 and 71 are conventionally provided with $\phi$ 1 and $\phi$ 2 input ports such that when a signal is presented at the $\phi$ 1 input port, the processor will be commanded to operate in its internal state, whereas if a pulse is present on the $\phi$ 2 input port, the processor will then be performing input and output functions. It will be seen that the clock output 86 is transferred to the $\phi$ 1 input port of the processor 69 and the clock output 85 is, in like manner, transferred to the $\phi$ 2 input port of the processor 69. However the clock outputs 86 and 85 respectively, are transferred to the opposite input ports in the case of the processor 71. In this manner, when a $\phi$ 1 clock output 86 is generated by the clock 70, it will cause the processor 69 to operate in the $\phi$ 1 state, and the processor 71 to operate in the $\phi$ 2 state. Conversely when a $\phi$ 2 clock output 85 is generated from the clock 70, the processor 71 will thus be operating in the $\phi$ 1 state whereas the processor 69 will be operating in the $\phi$ 2 state.

It will be recalled from previous discussion that a processor 69 or 71 is able to transmit or receive information only after an appropriate address command 84, 43A, or 93 has been generated by the respective processors 69 and 71. Thus, it follows that if these respective address commands for a given microporcessor are generated correlative to the receipt of inputs at the microprocessor's $\phi$2 port the resulting effect is that access to the memories 63-68, the controller 20, and the plotter interface 49, display 61, and recorder 62 by the processors 69 and 71 will thus be controlled and restricted to alternating respective machine half-cycles, as previously described. In this manner, each microporcessor may have access to identical memory locations to coordinate their sequential operations on data so as to improve data throughput in a manner to be described.

Referring again to FIG. 2A, it will be recalled that the primary storage 35 will have sequentially stored therein digital representations of function values for total and water-filled porosity corresponding to a sequence of borehole elevations and derived during the logging operation. When such representations are available for further processing, the controller 20 will so indicate to the microprocessor 69 by means of the information signal 43. The microprocessor 69, in turn, will continuously sense the availability of storages 64 and 65 for receipt of additional data.

In response to the indications on signal 43 that additional data is ready for transfer, the microprocessor 69 will generate a storage status signal 43a, instructing the controller 20 whether to transfer additional data, dependent upon the present capacity of the storages 64 and 65. If excess storage capacity exists, digital representations of function values for the first porosity curve will be transferred on the information signal 43 to the microprocessor 69, and thereafter to the storage 64 on the data line 83. It will be recalled that prior to such transfer of the data to the storage 64, an appropriate address command 84 will be generated by the microprocessor 69 and delivered to the storage 64, so as to store the data in the proper depth-based sequence at a correlative memory location.

In like manner, correlative values for the second porosity curve will be delivered on the data line 81 for storage in the storage 65, after an appropriate address command 84 has also been delivered to the storage 65. If the storages 64 and 65 are full, however, the microprocessor 69 will alternatively generate a storage status signal 43a so indicating to the controller 20, which will defer data transfer until such time as the signal 43a indicates that the storages 64 and 65 have storage capacity for its receipt.

When pairs of digital representations of function values for total and water-filled porosity porosity, each pair derived at a different borehole elevation, have thus been sequentially stored in the respective storages 64 and 65 in the order of derivation at correlative sequential borehole elevations, the microprocessor 69 will begin deriving bit-patterns for each value as follows.

Referring again to FIGS. 3A and 3D, it will be recalled, for purposes of illustrations, that a normalized value of "75" for water-filled porosity at a particular borehole elevation has been derived by the controller 20 from logging measurements at that borehole location. The digital representation for this value of 75, or 1001011, will be retrieved on the data line 83 by the microprocessor 69 from its memory location in storage 64, in response to a corresponding address command 84.

The microprocessor 69 will then, in response to the previously noted program steps delivered from the memory 63 on output 74, decode this digital representation, generate a bit-pattern of 74 0's followed by a 1, and then continue generating 0's until a total of 1664 bits are generated. This bit-pattern will then be delivered on the data line 80 to the storage 66 along with the corresponding address command 84.

In like manner, again referring to FIGS. 3A and 3D, it will be seen that a value of 90 for total porosity at this borehole elevation has also been derived by the controller 20 from logging measurements at this elevation, and the digital equivalent thereof, or 1011010 stored in the storage 65. The microprocessor 69 will decode this digital representation, and generate a second curve bit-pattern of 89 0's followed by a 1, and then continue generating 0's until a total of 1664 bits are generated. This bit-pattern will, also in like manner, then be delivered on the data line 79 to the corresponding storage 67 along with the corresponding address command 84. This process will be continued by the microprocessor 69 whereby digital representations of pairs of function values, each pair derived at a different discrete and sequential borehole elevation, are transformed into bit-patterns of 1664 bits wherein the location of the 1 in the bit-pattern sequence corresponds to the function value. It will thus be appreciated that the bit-pattern storages 66 and 67, during operation of the present invention, will contain pluralities of such pairs of bit-patterns, each value of a given pair being stored in its respective storage 66 or 67 sequentially in the same order in which the function values were derived.

Referring now to the generation of a third bit-pattern for lithology symbols, it will be recalled that a 16×16 matrix of bits comprising a desired symbol such as the cross-hatching of FIG. 3C has preferably been stored in the memory 63. It will also be recalled that in the generation of the first and second bit-patterns for the first horizontal line, digital representations of the first and second curve or function values of 90 and 75 have been retrieved from the respective storages 64 and 65 by the microprocessor 69. After the correlative first and second bit-patterns have been generated by the microprocessor 69 and stored in the bit-pattern storages 66 and 67, the microprocessor 69, in response to program steps delivered on the output 74, will begin constructing the bit structure for the symbols as follows.

The microprocessor 69 will begin generating a series of 75 0's which will be sequentially delivered on the data line 77 and stored in memory locations in the storage 68 corresponding to sequential address commands 84. The 75th bit will correspond to the second function value of "75" and will also correspond to the 11th bit in the fifth repetition of a 16 bit line from the matrix.

When the 75th 0 bit has been generated and placed in the storage 68, the microprocessor 69 will then begin to deliver to the storage 68 the sequence of 1's and 0's contained in the memory 63 corresponding to a horizontal line of the symbol pattern of FIG. 3C, starting with the twelfth bit in the line of FIG. 3C. When the 16th bit in the line of the symbol has been retrieved from the memory 63 and placed in the storage 68, the sequence will recycle to the beginning of the symbol line of the matrix, as additional 1's and 0's in the symbol bit-pattern for the line are withdrawn from the memory 63 by the microprocessor 69 and delivered to the bit-pattern storage 68.

It will be recalled that the microprocessor 69 also has access to the first function value of "90" stored in the first curve data storage 64. A routine is further provided in the program to the microprocessor 69 such that the microprocessor 69 will detect when the total number of symbol bits thus generated as previously described equals the first function value of 90, after which 0's will continue to be generated and delivered to the storage 68 until the total number of such bits equals 1664. In accordance with the process just described, it will thus be appreciated that the bit-pattern storage 68 will now contain a sequence of 1664 0'S and 1's. More particularly, 1's will be located at bit positions 80, 81, 88 and 89, corresponding to locations of 1's in a repeating sequence of the first line of the bit-pattern of FIG. 3C disposed within the first and second curve boundaries and starting with the twelfth bit in the line.

The hereinabove noted steps will thereafter be repeated as follows. A next pair of function values for the first and second curves, derived from parameters measured at a next borehole elevation, will be withdrawn by the microprocessor 69 from the next correlative memory locations of storages 64 and 65. From these values, a next pair of bit patterns for the first and second curve will, in like manner, be generated by the microprocessor 69 and stored in correlative memory locations in the storages 66 and 67 adjacent to the previously derived bit-patterns. A third or symbol bit-pattern will then be generated by the microprocessor 69 and stored in the bit-pattern storage 68. However, in the case of this second symbol bit-pattern, the second line of the symbol matrix of FIG. 3C rather than the first will be repetitively used to generate the symbol pattern between this next pair of first and second function values which again serve as the right and leftmost boundaries for the symbol pattern thus generated and stored in the storage 68.

This process of generating three sets of horizontal bit-patterns of 1664 bits each, corresponding to first and second function values derived at a borehole depth and a symbol pattern determined by the right and left boundaries set by the two function curves, will sequentially continue for each pair of function values in the storages 64 and 65.

When a set of three such bit-patterns has thus been generated and is present in the storages 66–68 and ready to be plotted, in response to an appropriate address command 93, the three sets of bit-patterns corresponding to a particular borehole elevation will be retrieved from the storages 66–68 by the microprocessor 71. More particularly, the program for the microprocessor 71 will be provided with a routine for combining or "or-ing" the three bit-patterns into one in preparation for printing or plotting the line. Correspondingly numbered bit locations in the three bit-patterns will be sequentially checked, and if a 1 occurs in any of the patterns, a 1 will be placed in the corresponding consolidated bit-pattern location. This will correspond, for example, to the "or-ing" of the top lines of FIGS. 3C and 3D resulting in the top line of FIG. 3B and 1's to the left of bit location 75 being blanked, in a manner previously described.

Referring again to FIG. 2, there will be seen a recorder 62, which will preferably be a conventional digital recorder well known in the art. When consolidated bit-patterns from the three storages 66–68 have been constructed by the microprocessor 71 as described, the resultant horizontal line of bit-patterns will be delivered on the microprocessor output 92 to the digital recorder 62. The digital tape thus produced will provide a convenient digital record of the graphical logging images thus produced which may be useful for later processing and further analysis.

There will also be seen in FIG. 2A a visual display 61. In like manner to the recorder, when the microprocessor 71 has combined the bit-patterns of storages 66–68 as described, the consolidated bit-pattern will be delivered on the microprocessor output 91 to a suitable visual display 61. This display 61 will preferably be of the storage type, whereby when a horizontal bit-pattern is delivered on the output 91 and displayed on the visual display 61, the graphic image thereof will remain as subsequent bit-patterns are delivered corresponding to adjacent borehole depths and also displayed in like manner. Thus a visual image such as that depicted in FIG. 3A will be available for logging personnel yielding direct symbolic indications of formation compositions being traversed by the sonde 2 during the logging operation.

As previously described, the logging system of the present invention will also preferably contain a plotter interface 49, a digital to analog converter 50, and a plotter 41. The purpose of the plotter interface 49 is to coordinate the speed of operation of the plotter 41 with the delivery of consolidated bit-patterns on the microprocessor output 48a in a manner to be described. The interface 49 will deliver on the interface output 49a the consolidated bit-pattern for a particular horizontal line to a conventional digital-to-analog converter 50 which, in turn, will convert the series of 0 and 1 bits to a horizontal sweep voltage which is intensified at times correlative to the appearance of 1's in the bit-pattern as they are shifted through the converter 50. This voltage will be delivered as converter output 50a to the digital plotter 41.

The plotter 41 preferably contains conventional logging film which may be exposed in functional response to the voltage of the converter output 50a. More particularly, in response to each bitpattern delivered to the converter 50 and converted to a sweep voltage, a correlative horizontal line across the film such as that shown at the top of FIG. 3A will be exposed in the film of the plotter 41. The film will then be advanced a preselected increment and in response to a next consolidated bit-pattern and corresponding converter output 50a, a next horizontal line will in like manner be exposed. Thus, it will be appreciated that as the film continues to advance and as successive horizontal lines are exposed, a permanent film record of the logging operation containing graphical images such as that depicted in FIG. 3A of two logging functions with direct symbolic indications of formation compositions will thus have been generated for analysis at a later date.

As previously noted, it is a feature of the present invention to coordinate the functions performed by the microprocessors 69 and 71 so as to maximize the through-put of data, which is required due to the relatively large processing times necessary to generate bit-patterns for the function curves as well as the symbology.

It will be appreciated that conventional film plotters, such as plotter 41, have a finite plotting speed at which bit-patterns can be transformed into visible light impressions on the film contained therein. It will also be noted that considerations of practicality constrain the number of bit-pattern sets, each corresponding to a function derived at a distinct borehole elevation, which may reside in the storages 66–68 at any one time. It would thus be desirable to provide a means for coordinating the rate at which the microprocessor 69 delivers generated bit-patterns to the limited storages 66–68 with the rate at which the microprocessor 71 retrieves these bit-patterns for delivery to the plotter 41 for printing. These rates will be a function of the speed of the plotter 41.

More particularly, it would be desirable to provide a memory location or "mailbox" common to both microprocessor 69–71, whereby the microprocessor 69 can determine the number of memory locations available in the storages 66–68 for newly derived bit-patterns, and whereby the microprocessor 71 can decrement this number as bit-patterns are retrieved and printed.

Referring to FIG. 2A, there will be seen a storage status register 72 having address/data signals 78 and 90 communicated to and from the microprocessors 69 and 71, respectively. It will be assumed, for purposes of illustration, that each storage 66–68 has capacity for a finite number of ten bit-patterns corresponding to ten regularly-spaced borehole elevations. Each time a set of three such bit-patterns for a borehole elevation, comprised of a first and second pattern for the first and second curve values and a symbol pattern therebetween, have been generated by the microprocessor 69 and delivered to the respective storages 66–68, the microprocessor 69 will, by means of the address/data signal, address a memory location of the register 72 and increment by 1 the number contained therein.

In like manner, each time the microprocessor 71 retrieves a set of such bit-patterns and they are printed by the plotter 41, the microprocessor 71 will, by means of the address/data signal 90, address the same memory location of the register 72 and decrement by 1 the number contained therein.

Thus it may be appreciated that by interrogating this memory location through the address/data signal 78, the microprocessor 69 can determine whether capacity exists in the storages 66–68 for a next set of bit-patterns derived from the corresponding digital representations in storages 64–65. For example, if this number is "10", this corresponds to full storages 66–68, such that no additional bit-patterns will yet be generated by the microprocessor 69.

Similarly, the microprocessor 71 can interrogate the same memory location of register 72 to determine whether there are additional sets of bit-patterns in the storages 66–68 to be plotted, and if so, the microprocessor 71 will retrieve them and deliver them to the plotter 41 for printing, decrementing the number in the register 72 by 1 for each set retrieved. Thus, for example, when the number reaches "0" corresponding to the fact that the microprocessor 69 presently has no more bit patterns generated for printing, the microprocessor 71 will enter an idle mode awaiting arrival of more bit-patterns in the storages 66–68.

It will thus be appreciated that a means has been provided for coordinating the processing time required for the microprocessor 69 to perform the functions allocated to it such as generating the bit-patterns with the time required for the microprocessor 71 and the plotter 41 to perform their respective allocated functions of plotting the data and symbols.

This coordinated division of function between the microprocessors 69 and 71, further enhanced by the sharing of a common machine cycle clock 70 and common memory locations, as hereinbefore discussed, enhances the "though-put" rate of data, processed by the microprocessors 69–71, from the controller 20 to the printer 41 in accordance with the present invention. This, in turn, results in correspondingly decreased delays from the time log parameters are measured to the time visible records of functions thereof including direct symbolic indications of formation composition are available. Thus, if desired, the logging engineer may obtain this record in real-time as the logging operation continues and make adjustments in response thereto. In the alternative, such a record may be produced in the field for further analysis from digital tapes of the logging parameters after the log has been completed in shorter periods of time than heretofore practicable.

Referring now to FIG. 4, there will be seen a pictorial representation of a typical display format presented by the recorder 39, CRT 40, and plotters 41 and 42 of the present invention during a logging operation or shortly thereafter. As will hereinafter be explained in further detail, it will be noted that a visible picture graphically depicting lithological formation composition has thus been provided, with direct symbolic indications of zones of interest which may be easily and quickly discerned.

It will be recalled that the symbol generator circuitry may conveniently be provided with alpha-numeric and grid line capability which, though omitted in the schematic display depicted in FIG. 3A for clarity, has been illustrated in FIG. 4. Specifically, it will be seen in FIG. 4 that the display has been conveniently divided from left to right into five vertical portions: a depth "track", followed by four logging data tracks 1–4.

Each portion may be provided with a vertical and horizontal system of perpendicular grid lines, such as those shown in tracks 1-3. The horizontal lines may each be conveniently positioned at regular intervals correlative to preselected borehole increments, such as 10 feet in FIG. 4, so as to facilitate association of displayed logging curve values with the depths within the borehole at which they were derived. Preferably displayed in a depth track such as that depicted in FIG. 4, will be a numerical indication of borehole depths at convenient intervals of, for example, 100 feet, as shown by the "8400" and "8500", corresponding to borehole elevations of 8,400 and 8,500 feet. Thus, for example, if a point of interest on a displayed logging curve appears in close proximity to the fourth horizontal line below the numerical "8400", this will indicate that the particular logging measurement or function value displayed was derived at an elevation of 8,440 feet within the borehole. With respect to the vertical grid lines displayed in tracks 1-3, it will be noted that their function is to provide a convenient scale whereby particular values of a displayed logging measurement or function may be determined.

Referring now more particularly to the logging measurements illustratively being displayed in FIG. 4, it will be noted that track 1 will be reserved for curvilinear representations of either fundamental or "raw" data such as gamma ray count measurements, as hereinbefore noted and depicted as curve 100, as well as intermediate functions thereof such as the shale percentage bulk volume curve 101. In like manner, track 2 may be reserved for other derived intermediate functions of interest, such as the water saturation curve 102 depicting water saturation $S_w$ as hereinbefore noted.

Referring to track 3, it will be noted that this track may be reserved for ultimate functions of interest which may, in turn, be functions of other raw data or intermediate functions, whether displayed or not, such as the gamma ray curve 100 and/or the water saturation curve 102. More particularly, in track 3 there will be seen a display of the total porosity function ($P_t$) curve 103 plotted on the same axis and normalized with respect to the also hereinbefore explained water-filled porosity function ($P_w$) curve 104.

It will be recalled that, as previously explained, lithological significance may be ascribed to borehole elevations wherein total formation porosity exceeds that of water-filled porosity. More particularly, such situations are frequently indicative of the probable presence of hydrogeneous zones, and the magnitude of the difference between the functions will be correlative to the magnitude of the particular zone. Thus, referring again to FIG. 4, it will be seen that the symbol generator circuitry of the present invention has provided cross-hatching in track 3 where the value of the total porosity curve 103 exceeds that of the waterfilled porosity curve 104, thus providing clear visible and graphical indications of possible hydrogeneous zones of interest, such as that indicated between the borehole elevations of 8,500 and 8,520 feet.

Referring to track 4 of FIG. 4, this track may conveniently be reserved for further derived functions of the formation lithology. More particularly, the curve 105 may be correlative to percentage bulk volume of clay as a function of borehole elevation, as derived from mathematical models well known in the art utilizing various welllogging measurements. In like manner, curve 106 may be derived whereby, similar to curves 103 and 104, any horizontal difference in magnitude between curves 106 and 105 may conveniently be indicative of percentage volume of quartz at a particular borehole elevation, and whereby the magnitude of the difference is correlative to the magnitude of bulk volume of the quartz. Also, in like manner to track 3, convenient lithological symbols may be selected for super position by the symbol generators of the present invention under the areas defined by the curves 105 and 106 so as to provide clear, immediate and graphical indications of lithological characteristics of interest at a particular borehole elevation. For example, referring to FIG. 4, it will be seen that the horizontal cross-hatching and diagonal cross-hatching under curve 105 and between curves 105 and 106, respectively, provide a clear indication at the borehole elevation of 8,400 feet that the formation at that elevation is comprised approximately of 75% clay and 25% quartz.

Many modifications and variations besides those specifically mentioned may be made in the techniques and structures described herein and depicted in the accompanying drawings without departing substantially from the concept of the present invention. Accordingly, it should be clearly understood that the forms of the invention described and illustrated herein are exemplary only, and are not intended as limitations on the scope of the present invention.

What is claimed is:

1. A method of investigating the character of subsurface earth materials traversed by a borehole, comprising:

deriving at least first and second depth-related well logging measurements at selected locations within and along the length of said borehole, deriving from said well logging measurements functionally related measurements of first and second selected lithological characteristics of said materials traversed by said borehole at said selected locations, sequentially storing said measurement of said first and second lithological characteristics, generating and storing a first sequential bit pattern corresponding to said first lithological characteristic, generating and storing a second sequential bit pattern corresponding to said second lithological characteristic, generating a preselected two-dimensional lithological bit pattern matrix corresponding to a preselected relationship between said first and second lithological characteristics, storing said bit pattern matrix, retrieving said first and second bit patterns and at at least a portion of said bit pattern matrix, and displaying a visible and recordable representation of said first and second bit patterns corresponding to said lithological measurements of said materials together with a correlative indication of the depth of said locations along said borehole and said at least a portion of said bit pattern matrix in the area between said first and second bit patterns.

2. The method described in claim 1, wherein at least one of said lithological measurements is derived on a real-time basis relative to at least one of said well logging measurements.

3. The method described in claim 2, wherein at least one of said lithological measurements is displayed and recorded on a real-time basis relative to at least one of said well logging measurements.

4. The method described in claim 1 wherein the step of displaying a representation of at least a portion of said matrix comprises the step of displaying a first representation of said matrix and at least a second representation of said matrix immediately adjacent said first representation.

5. The method described in claim 4 wherein said display of said at least a second representation of said matrix adjacent a first side of said first representation forms a geometrical pattern substantially similiar to said display of said at least a second representation adjacent a second side of said first representation.

6. The method described in claim 5 wherein said matrix comprises a 16×16 matrix of bits.

7. A system for investigating the character of subsurface earth materials traversed by a borehole, comprising:

logging means for surveying the length of said borehole, sensing means in said logging means for deriving at least first and second depth-related and electrical logging signals from said materials within and at selected locations along the length of said borehole, signal controller means for deriving from said electrical logging signals at least first and second functionally related measurements of selected lithological characteristics of said materials traversed by said borehole at said selected locations, first data storage means for sequentially storing said measurement of said first lithological characteristic, second data storage means for sequentially storing said measurement of said second lithological characteristic, first curve storage means for storing a first bit pattern corresponding to said first lithological characteristic, second curve storage means for storing a second bit pattern corresponding to said second lithological characteristic, first processor means interconnected between said data storage means and said curve storage means for transforming said lithological measurements into said corresponding bit patterns, symbol storage means for storing a two-dimensional bit pattern matrix corresponding to preselected relationships between said lithological characteristics, second processor means interconnected to said first curve storage means, said second curve storage means and said symbol storage means for generating a composite bit pattern corresponding to said measurements of said lithological characteristics and at least a portion of said two-dimensional matrix, and display means interconnected with said processor means for electrically presenting a visible and recordable representation of said lithological measurements together with a correlative indication of the depth of said locations along said borehole and said at least a portion of said bit pattern matrix.

8. The system described in claim 7, wherein said sensing means and signal processing means are interconnected to derive at least one of said lithological measurements as a function of one of said logging signals and to derive the other of said lithological measurements independently of the other of said logging signals.

9. The system described in claim 8, wherein said signal processing means is interconnected with one of said sensing means for deriving at least one of said lithological measurements on a real-time basis relative to at least one of said logging signals.

* * * * *